Jan. 29, 1935.   A. LEFKOWITZ   1,989,140
RAINCOAT AND METHOD OF MAKING THE SAME
Filed July 6, 1934   2 Sheets-Sheet 1
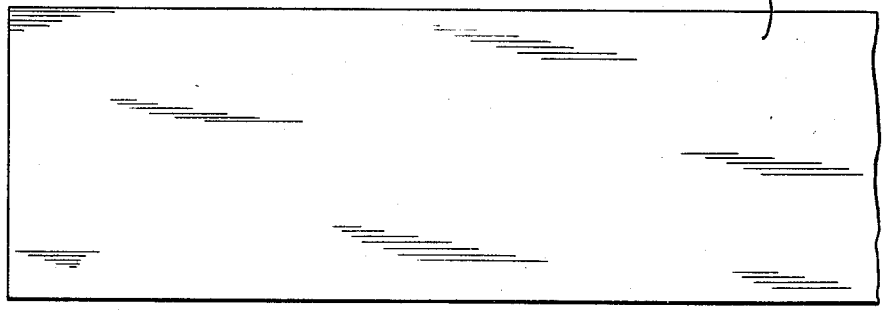
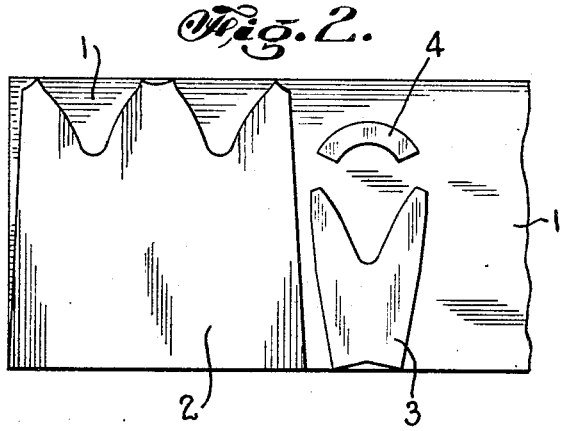
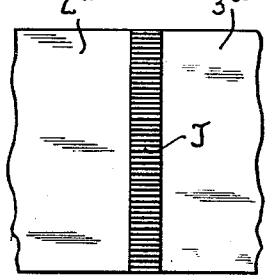
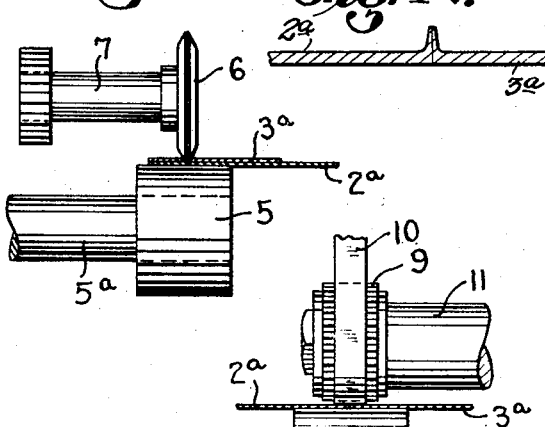
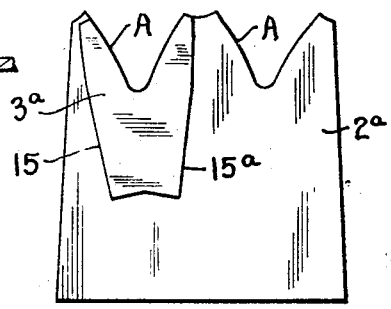
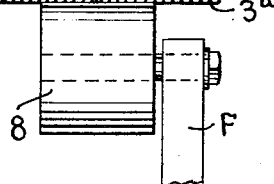
INVENTOR.
Arthur Lefkowitz
BY
Mock & Blum
ATTORNEYS.

Jan. 29, 1935. A. LEFKOWITZ 1,989,140
RAINCOAT AND METHOD OF MAKING THE SAME
Filed July 6, 1934 2 Sheets-Sheet 2

INVENTOR.
Arthur Lefkowitz
BY Mock & Blum
ATTORNEYS.

Patented Jan. 29, 1935

1,989,140

UNITED STATES PATENT OFFICE 1,989,140

RAINCOAT AND METHOD OF MAKING THE SAME

Arthur Lefkowitz, Jackson Heights, N. Y., assignor to Beyerle Mfg. Co. Inc., Brooklyn, N. Y., a corporation of New York Application July 6, 1934, Serial No. 734,008

10 Claims. (Cl. 154—42)

My invention relates to a new and improved raincoat and to a new and improved method of making the same.

One of the objects of my invention is to provide a raincoat which is made throughout of pure gum rubber which has been suitably vulcanized.

Another object of my invention is to provide a method of making a raincoat, which shall be extremely simple, quick and economical.

Another object of my invention is to provide a raincoat made of sheet rubber, and of improved construction.

Other objects of my invention will be set forth in the following description and drawings which illustrate a preferred embodiment thereof, it being understood that the above statements of the objects of my invention is intended to generally explain the same without limiting it in any manner.

Fig. 1 is a plan view of a sheet of calandered and unvulcanized rubber from which the pattern-pieces are cut.

Fig. 2 illustrates how the pattern-pieces are applied to the sheet of rubber, or to a suitable number of superposed sheets of rubber.

Fig. 3 illustrates how the sleeve member is applied to the body member.

Fig. 4 is a diagrammatic view of the device for trimming the applied pieces of sheet rubber and for pressing them together at their edges or seam portions.

Fig. 5 is a diagrammatic view of the device for applying a reinforcing strip of rubber and for corrugating the connected edges in order to strengthen the connection. The device shown in Fig. 5 can also be utilized if the edge portion of a part of the garment is inturned in order to provide a smooth edge.

Fig. 6 is a plan view showing how two pieces of the material are joined together.

Fig. 4a is a detail view showing the two sheets of rubber after they have been acted upon by the rolls 4 and 5 and when said sheets of rubber are in the same plane.

Figure 7:
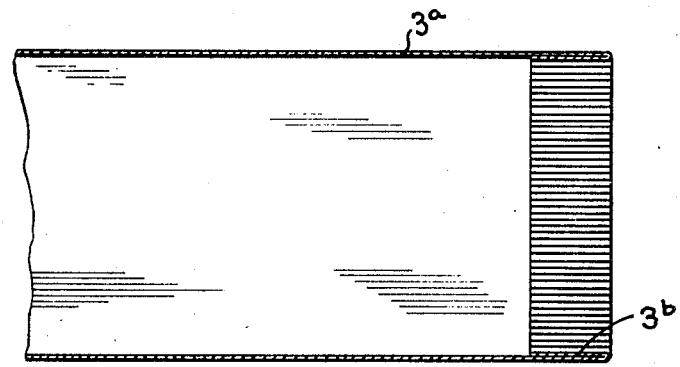
Fig. 7 is a sectional view of a sleeve showing the inturned edge portion.

A suitable number of streets 1, composed of unvulcanized gum rubber, are first superposed so as to make a pile of any suitable height. These sheets of rubber are suitably treated so that they do not adhere to each other, unless sufficient pressure is applied.

As shown in Fig. 2, a body pattern-piece 2, a sleeve pattern-piece 3, and a collar pattern-piece 4, are applied to the sheet or pile of sheets 1.

The sheet or pile of sheets of rubber is severed along the outlines of the pattern-pieces, by means of any suitable tool. For this purpose I can utilize an electrically heated tool having a wedge-shaped tip. This heated tip severs the sheets of rubber.

As many as a hundred or one hundred and fifty sheets or rubber can be placed in the pile, and the height of this pile may be two inches or two and one-half inches or more.

Therefore the garment is made of relatively thin rubber.

The thickness of each individual rubber sheet may be from four thousandths of an inch (.004 inch) to ten thousandths (.010) of an inch, and up to fifteen thousandths (.015) of an inch or even more.

As shown in Fig. 3, the sleeve member 3a, which conforms to the pattern-piece 3, is then applied in proper relation to the body member 2a which conforms to the pattern-piece 2.

The edges of the sleeve member are placed above the corresponding edges of the body member. Of course another sleeve member is applied to the corresponding part of the body member. In order to join a pair of the rubber members together at their edges, said edges are fed between a cylindrical roll 5, which is mounted upon a suitable shaft 5a, and a supplemental roll 6, which is mounted upon a shaft 7. The shafts 5a and 7 are turned in unison.

The roll 6 has a tapered or wedge-shaped edge having a cylindrical rim, and the cylindrical rim of this edge cuts through the edges of the thin sheets of rubber, and said rolls 5 and 6 simultaneously compress said sheets of unvulcanized rubber, the pressure being sufficient to join said edges to each other. This joining is accomplished along the margin of each arm hole A.

If desired, the collar member could be joined to the collar portion of the body member 2a, in the same manner. However, I have found it economical and practical to sew the collar member to the body member.

After a pair of members have been trimmed and joined by means of the device shown in Fig. 4, the joined edges are led between a roll 8, and supplemental roll 9.

When a pair of rubber members are provided with a welded seam by means of the device shown in Fig. 4, the pressure exerted between the cylindrical roll 5 and one of the tapered faces of roll 6, produces a welded seam whose thickness is less than the combined thicknesses of the two rubber sheets. When these two rubber sheets are now separated from each other so that they lie in the same plane, the welded seam forms an upstanding ridge.

While the two sheets of rubber are located in the same plane, they are led between the rolls 8 and 9. Said rolls compress this upstanding ridge so that the plastic and unvulcanized rubber is additionally shaped and the thickness of the welded seam is then substantially the same as the thickness of each of the rubber sheets. The effect is the same as though the members 2a and 3a had been originally cut out from a single planar sheet of rubber. Hence the final welded seam has substantially the same thickness as the body or the sleeve, in all positions of the sleeve relative to the body.

In order to accomplish these results I use rubber which is quite thin and the pressure between the rolls 8 and 9 is exerted along a sufficient area.

It will be noted that the rollers 5 and 6, and the rollers 8 and 9, respectively contact only with a portion of the two rubber members. Hence, the action of each said pair of rolls is successive, as distinguished from a pair of dies which would act simultaneously upon the full lengths of the edges of the rubber members.

The rolls 5 and 6 produce a rolling trimming and compression action, successively along the edges of the sheets.

In order to reinforce the connected portion of the two sheets of rubber, a reinforcing strip 10 may be applied, and this reinforcing strip 10 is also made of unvulcanized rubber which may be joined to the rubber members, such as 2a and 3a, by means of suitable pressure.

The roll 8 has a smooth periphery and the roll 9 has a grooved periphery, so that a corrugated joined area J is produced.

The rubber is so thin in comparison to the radial height of the teeth 9 as to produce corrugations on both sides of the joinder area J.

The roller 8 may be an idler whose shaft is suitably mounted upon the frame F, and the corrugated roller 9 is mounted upon a driven shaft 11.

Referring to Fig. 7, this shows the inturned edge of the completed sleeve member 3a. This inturned edge portion 3b is connected to the body of the sleeve member 3a by using the device shown in Fig. 5 but without utilizing the reinforcing strip 10. Hence the inturned edge of the sleeve is corrugated both on its inside surface and on its outside surface, and the thickness of said inturned edge is substantially the same as the thickness of the body of the sleeve, there being only a slight excess.

In order to join the longitudinal edges 15 and 15a of the sleeve member to each other, the device shown in Fig. 4 may be utilized. It is not necessary to use the reinforcing strip 10, or the device shown in Fig. 5, although a reinforcing strip could be applied with the use of the device shown in Fig. 5.

Likewise and if desired, the device shown in Fig. 5 could be utilized, after the use of the device shown in Fig. 4, but without the use of the reinforcing strip 10, in order to join the longitudinal edges 15 and 15a to each other.

The collar member 4a may be sewed into position by means of a well known sewing machine such as the Merrow or the like.

The front edges of the body member are provided with snap member fasteners S.

The garment may be provided with reinforcing rubber strips wherever the snap fasteners are located.

Figure 8:
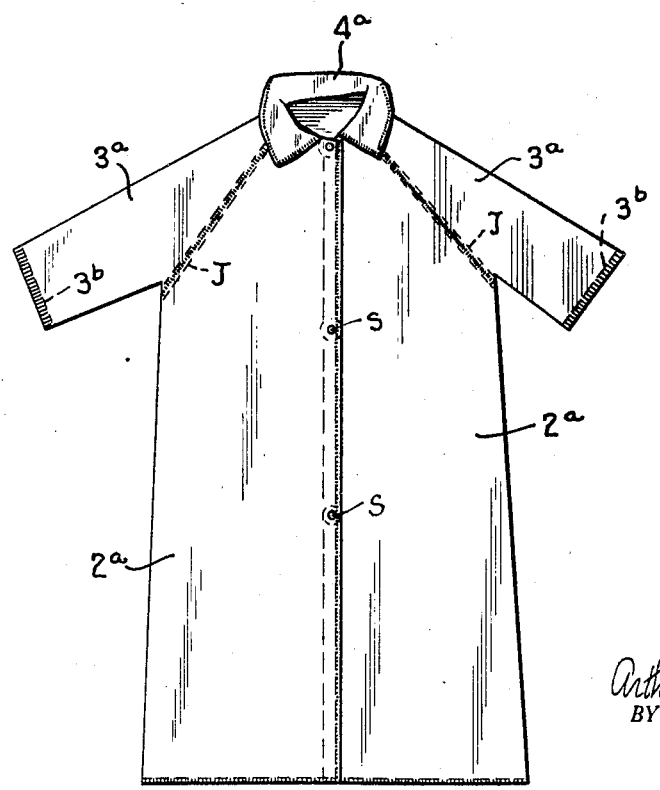
Fig. 8 is an elevation of a completed garment.

Referring to Fig. 8, it can be seen that the sleeves are joined to the body portion of the garment, along lines which are sharply inclined to the longitudinal axis of the garment.

After the main rubber members have been joined and before applying the fasteners and their reinforcing strips, the rubber garment is vulcanized by means of a hot cure in a steam chamber. If the collar is to be sewed on, the collar is separately vulcanized, and the vulcanized collar is then sewed to the vulcanized garment.

The fasteners are then applied, and their reinforcing strips may be cemented to the body of the garment.

The completed garment is in effect a one-piece rubber coat, since the sewing of the collar is a minor detail. The garment is free from any objectionable bulges at the areas where the sleeves are joined thereto.

The improved method of manufacture makes it possible to manufacture the garment at an extremely low cost.

It will be noted that the rubber members are simultaneously trimmed and joined by means of a rolling pressure, which is successively applied along the edges of the pieces to be joined. This is superior to the use of dies, which would simultaneously exert their pressure along the entire lengths of said edges to be joined. The unvulcanized rubber is plastic and compressible and the use of pressure which is successively applied along the edges, produces the desired coalescence of the rubber sheets without any objectionable bulges or distortion of the rubber sheets. For convenience, the joined edges of the rubber members, made as previously described, can be designated as "coalesced" edges.

I have shown a preferred embodiment of my invention, but numerous changes and omissions could be made without departing from its spirit.

I claim:

1. A rubber garment which includes rubber members having integral coalesced edges which form a seam, said seam having substantially the same thickness as the adjacent rubber members, said seam having corrugations at its inner and outer surfaces.

2. A rubber garment which includes rubber members having integral coalesced edges which form a seam, said seam having substantially the same thickness as the adjacent rubber members, said seam having a rubber reinforcing strip applied thereto, said seam and said strip having corrugations, the inner and outer surfaces of said seam being corrugated.

3. A rubber coat having a body made of vulcanized sheet rubber and sleeves made of vulcanized sheet rubber, said body and said sleeves having trimmed and coalesced edges which form a seam, said seam having substantially the same thickness as said body and said sleeve in all positions of said sleeve relative to said body.

4. A rubber coat having a sleeve made of vulcanized sheet rubber, the outer edge portion of said sleeve being inturned and being coalesced with the body of the sleeve, said inturned edge portion having substantially the same thickness as said body.

5. In the art of making a rubber coat, those steps which consist in forming a seam by joining the edges of a body member and of a sleeve member which are made of unvulcanized sheet rubber by means of a rolling trimming and compression action which is successively exerted along said edges in order to form said seam, said compression being sufficient to coalesce said edges, and then additionally compressing and corrugating the coalesced edges.

6. In the art of making a rubber coat, those steps which consist in forming a seam by joining the edges of a body member and of a sleeve member which are made of unvulcanized sheet rubber by means of a rolling trimming and compression action which is successively exerted along said edges, said compression being sufficient to coalesce said edges, and the additionally compressing and corrugating the coalesced edges while applying to said edges a reinforcing strip of sheet rubber which is also compressed and corrugated.

7. In the art of making a rubber coat from sheets of plastic unvulcanized rubber, those steps which consist in compressing the edge portions of said sheets while said sheets are superposed, so that the material of said edge portions is caused to coalesce, and simultaneously causing the compressed rubber to flow towards the edges of said sheets, so that the thickness of said edge portions is reduced, and then compressing said edge portions while said sheets are separated from each other save at the initially coalesced edge portions, the second compression being exerted in a direction which is substantially perpendicular to the first mentioned compression.

8. In the art of making a rubber coat from sheets of plastic unvulcanized rubber, those steps which consist in compressing the edge portions of said sheets while said sheets are superposed, so that the material of said edge portions is caused to coalesce, and simultaneously trimming the edges of the sheets and causing the compressed rubber to flow towards the edges of said sheets, so that the thickness of said edge portions is reduced and then compressing said edge portions while said sheets are separated from each other save at the initially coalesced edge portions, the second compression being exerted in a direction which is substantially perpendicular to the first mentioned compression.

9. In the art of making a rubber article from sheets of plastic and unvulcanized rubber, those steps which consist in compressing the edge portions of superposed sheets in order to cause the rubber material of said edge portions to coalesce so as to form a seam, and then subjecting said seam to additional pressure while said sheets are separated from each other save at the initially coalesced edge portions, the second compression being exerted in a direction which is substantially perpendicular to the first mentioned compression.

10. A rubber garment having rubber pattern pieces which have welded edges which form a seam, said seam having substantially the same thickness as the adjacent edge-portions of said pattern pieces when said pattern pieces are in the same plane.

ARTHUR LEFKOWITZ.